(12) United States Patent
Morrison

(10) Patent No.: US 6,945,195 B1
(45) Date of Patent: Sep. 20, 2005

(54) ANIMAL ENTERTAINMENT DEVICE

(75) Inventor: Mark D. Morrison, New York, NY (US)

(73) Assignee: MPDI, Stamford, CT (US)

( * ) Notice: Subject to any disclaimer, the term of this patent is extended or adjusted under 35 U.S.C. 154(b) by 0 days.

(21) Appl. No.: 10/833,513

(22) Filed: Apr. 28, 2004

(51) Int. Cl.⁷ ............................................. A01K 29/00
(52) U.S. Cl. ..................................... 119/707; 446/170
(58) Field of Search ........................ 119/707, 711, 702, 119/708, 709, 710; 446/168, 170; D30/160; 273/123 R

(56) References Cited

U.S. PATENT DOCUMENTS

| | | | |
|---|---|---|---|
| 3,638,350 A | 2/1972 | Wiggen | 46/47 |
| 3,648,403 A * | 3/1972 | Gommel | 446/491 |
| 4,451,038 A * | 5/1984 | Nagy | 273/110 |
| 4,722,299 A * | 2/1988 | Mohr | 119/707 |
| 4,756,530 A * | 7/1988 | Karman | 273/113 |
| 4,841,911 A * | 6/1989 | Houghton | 446/227 |
| 4,880,236 A * | 11/1989 | Hwang | 273/113 |
| 5,009,193 A * | 4/1991 | Gordon | 119/711 |
| 5,139,453 A * | 8/1992 | Aiken et al. | 446/75 |
| D335,553 S | 5/1993 | Conner | D30/160 |
| 5,269,261 A | 12/1993 | McCance | 119/706 |
| 5,343,828 A * | 9/1994 | Houghton et al. | 119/51.03 |
| 5,351,650 A | 10/1994 | Graves | 119/707 |
| 5,390,629 A | 2/1995 | Simone | 119/711 |
| 5,529,017 A | 6/1996 | Udelle et al. | 119/707 |
| 5,536,007 A * | 7/1996 | Snyder | 273/118 R |
| 5,540,187 A | 7/1996 | Udelle et al. | 119/706 |
| 5,542,376 A | 8/1996 | Udelle et al. | 119/707 |
| 5,572,955 A * | 11/1996 | Boshears | 119/706 |
| 5,579,725 A | 12/1996 | Boshears | 119/706 |
| 5,673,652 A | 10/1997 | Witte | 119/707 |
| 5,692,944 A | 12/1997 | Pellicone | 446/170 |
| 5,778,825 A | 7/1998 | Krietzmen et al. | 119/708 |
| 5,785,005 A | 7/1998 | Udelle et al. | 119/706 |
| 5,809,938 A * | 9/1998 | Baiera et al. | 119/707 |
| 5,819,690 A | 10/1998 | Brown | 119/707 |
| 5,823,844 A * | 10/1998 | Markowitz | 446/175 |
| D405,563 S | 2/1999 | Baiera et al. | D30/160 |
| 5,870,971 A * | 2/1999 | Krietzman et al. | 119/707 |
| 5,875,736 A * | 3/1999 | Udelle et al. | 119/706 |
| 5,881,679 A | 3/1999 | Hann | 119/708 |
| 5,924,908 A * | 7/1999 | O'Heir | 446/168 |
| D412,767 S | 8/1999 | Bemis et al. | D30/160 |
| 6,032,615 A * | 3/2000 | Girard | 119/707 |
| 6,098,571 A | 8/2000 | Axelrod et al. | 119/707 |
| 6,186,095 B1 * | 2/2001 | Simon | 119/707 |
| 6,231,345 B1 * | 5/2001 | Yamazaki et al. | 434/259 |
| 6,237,538 B1 | 5/2001 | Tsengas | 119/707 |
| 6,405,682 B1 * | 6/2002 | Simon | 119/707 |
| 6,557,494 B2 | 5/2003 | Pontes | 119/707 |
| 6,568,353 B2 * | 5/2003 | Van Sluis | 119/702 |
| 6,571,742 B1 | 6/2003 | Tsengas | 119/707 |
| 6,591,785 B1 * | 7/2003 | Boshears | 119/707 |
| 6,609,944 B1 * | 8/2003 | Viola | 446/409 |
| D480,518 S * | 10/2003 | McGinty | D30/160 |

* cited by examiner

Primary Examiner—Yvonne R. Abbott
(74) Attorney, Agent, or Firm—Hayes Soloway PC

(57) ABSTRACT

An entertainment device for use by animals is disclosed. The entertainment device can have a hollow enclosure with access openings and exit openings. The hollow enclosure may have one or more play items with diameters larger than the access openings and the exit openings within the enclosure. The hollow enclosure may also have one or more smaller play items with diameters larger than the access openings and smaller than the exit openings. The smaller play items may be used external to the hollow enclosure to entertain the animal.

19 Claims, 8 Drawing Sheets

ANIMAL ENTERTAINMENT DEVICE

FIELD OF THE INVENTION

The present invention is generally related to an animal entertainment device, and more particularly is related to an enclosure with openings that provide the animal access to play items within the enclosure.

BACKGROUND OF THE INVENTION

Animals are naturally inquisitive creatures, often with a natural instinct to chase and play with objects within their environment. Many domestic animals rely on their owners as a source of companionship. However, many owners often have busy daily schedules that restrict the amount of time that an owner can commit to entertaining a pet. Owners often rely on pet toys or animal entertainment devices such as balls or string. The pet toys allow the animal to chase and grab at the toy. To gain the animals attention, the toys often move either under their own power, or by momentum from the pet or owner. For example, a feline may bat at a ball and cause the ball to roll. The movement of the ball further engages the attention of the feline and causes the feline to continue to chase and bat at the ball.

While the ball can captivate an animal for an extended period of time, balls and other play toys often get stuck in a corner or under furniture. The stuck ball loses the attention of the pet and remains in the stuck/hidden position until an owner eventually locates the toy. In addition, the toy or ball often ends up in places that generate hazards to individuals, such as at the bottom of a set of stairs.

Many pet toys have been developed to overcome these associated problems by providing a housing. The housing holds the play objects within the housing. The housing has holes or slits that allow the pet to insert paws and bat at the play object within the housing. The play object bounces around within the object and keeps the attention of the pet while preventing the play object from becoming lost or stuck. While these toys overcome the associated drawbacks of an independent ball or play object, they often cause a pet to become frustrated. After a period of playing with the play objects housed within the enclosure, the pet recognizes that they will never be able to fully grab and the play with the object. This often causes the pet to become unsatisfied and no longer play with the enclosure.

Thus, a heretofore unaddressed need exists in the industry to address the aforementioned deficiencies and inadequacies.

SUMMARY OF THE INVENTION

In one aspect, the invention features an entertainment device for use by animals. The entertainment device has a hollow enclosure with one or more access openings and one or more exit openings. The entertainment device has one or more play items with diameters larger than the access openings and the exit openings within the enclosure. The entertainment device also has one or more smaller play items with diameters larger than the access openings and smaller than the exit openings within the enclosure. The enclosure can also have a maintenance opening with a diameter larger than the play items.

The enclosure may have a weighted base. The weighted base can be a compartment filled with weighted filler material. The one or more exit openings can be located on a surface of the hollow enclosure that requires manipulation of the smaller play item by the animal to remove the smaller play items through the one or more exit openings. The access openings may be large enough for the animal to insert a paw.

In another aspect, the entertainment device has an exterior surface that resembles a mouse or other character. The play item within the enclosure may have an animal attractant housed within the play item. The play items may be spheres that comprise two hemispheres that couple together. The animal attractant can be placed within the two hemispheres prior to coupling the hemispheres together to form the sphere. The entertainment device may also have one or more wires extending from an exterior surface of the hollow enclosure. The one or more wires can wiggle when contact with the enclosure vibrates the wires. The one or more wires extending from the exterior surface of the enclosure may resemble whiskers of a mouse or other small animal. Each of the one or more wires may also have a fabric strip extending from a distal end of the wire.

The animal entertainment device, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
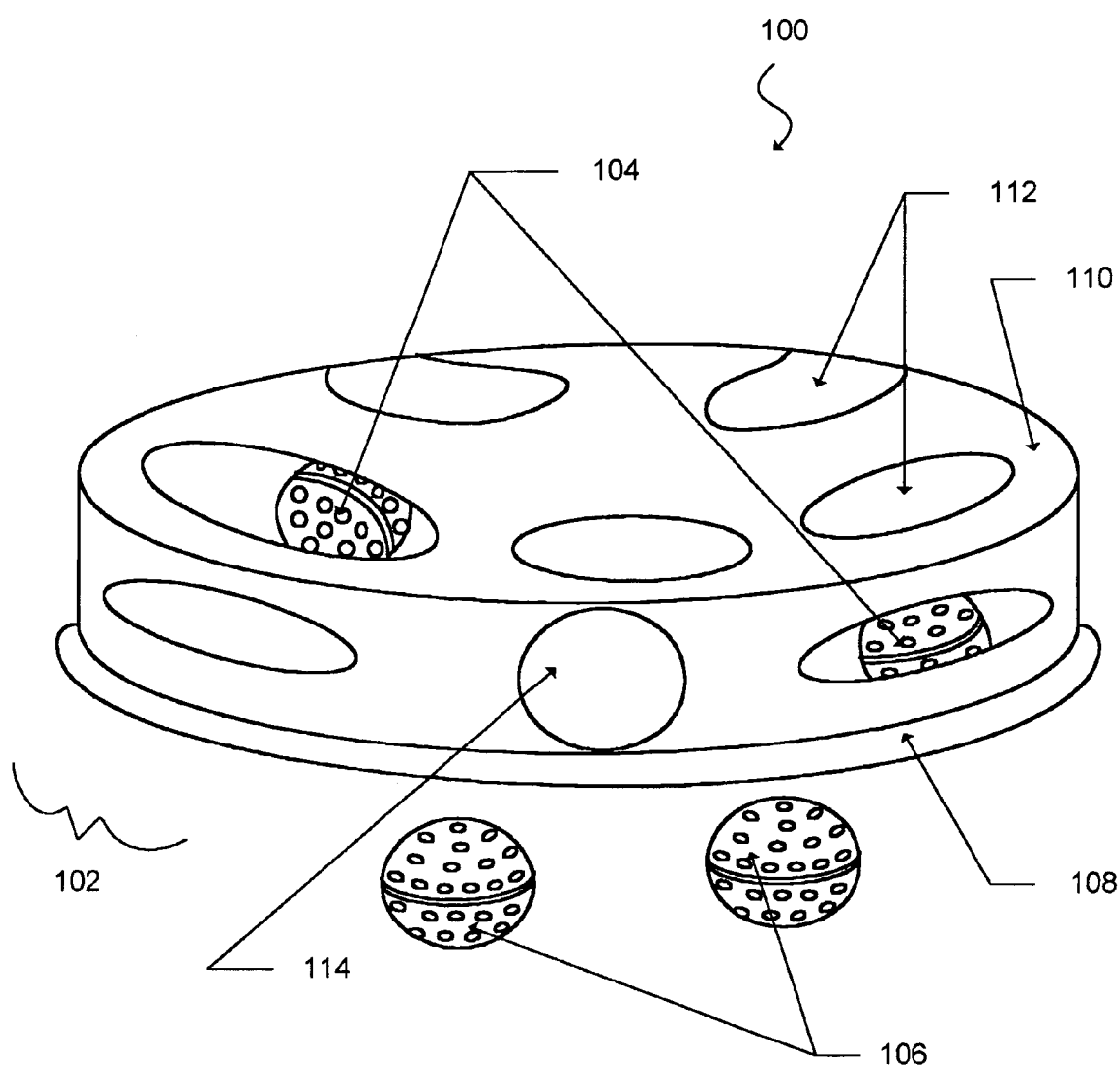
FIG. 1 is a perspective view of an animal entertainment device, in accordance with a first exemplary embodiment of the invention.
Figure 2:
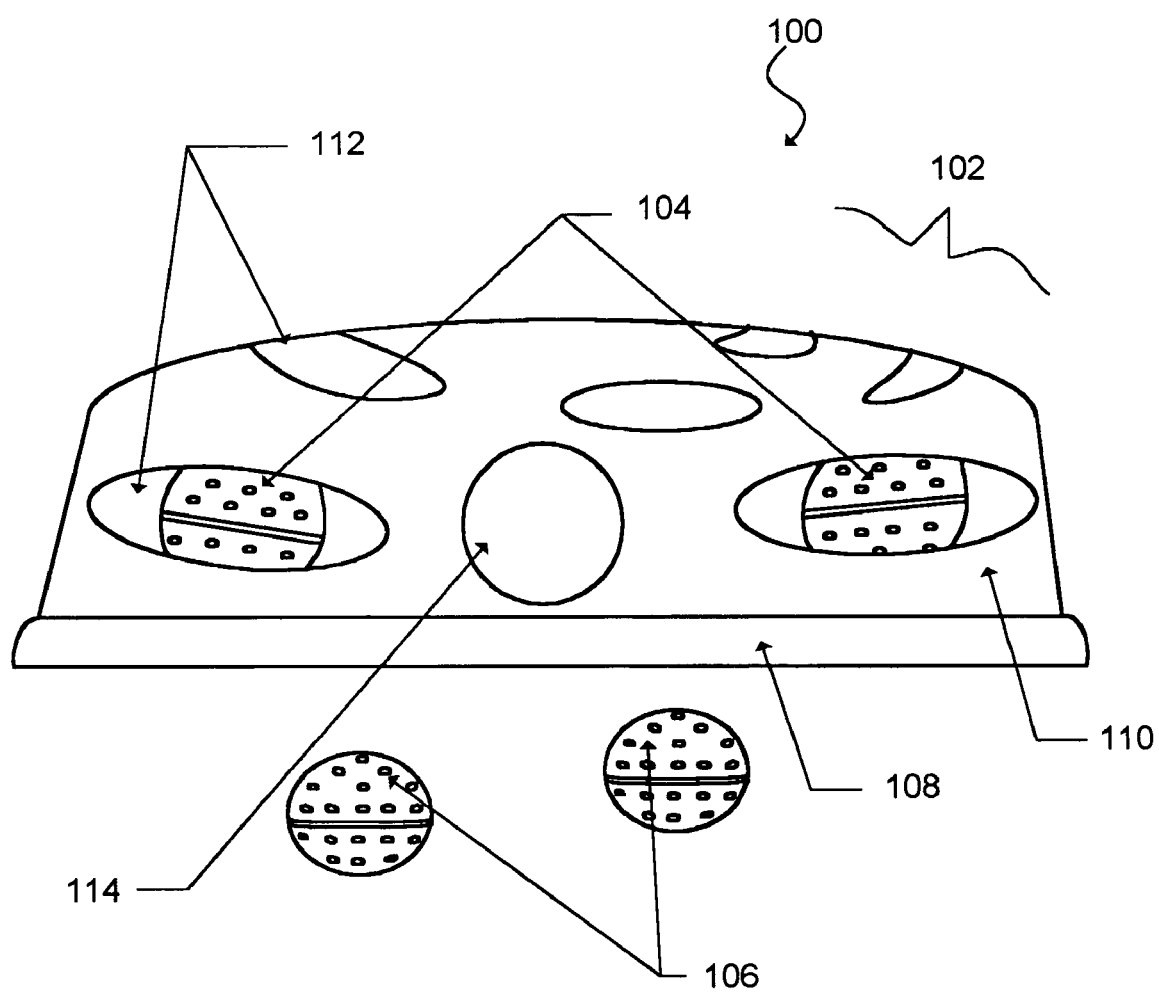
FIG. 2 is a side plan view of an animal entertainment device, in accordance with the first exemplary embodiment of the invention.

FIG. 1 is a perspective view and FIG. 2 is a side plan view of an animal entertainment device 100, in accordance with the first exemplary embodiment of the invention. The animal entertainment device 100 has a housing 102, one or more internal play items 104, and one or more external play items 106. The housing 102 may include a base 108 and a hollow enclosure 110. The hollow enclosure 110 can have one or more access openings 112 and one or more exit openings 114. The external play items 106 and internal play items 104 initially can be located within the hollow enclosure 110. The animal or pet plays with the play items 104, 106 by inserting their paws through the access openings 112. The pet plays with the play items 104, 106 by making contact with the play items 104, 106 located in the interior of the hollow enclosure 110 and batting the play items 104, 106. The external play items 106 can be removed by the pet from the hollow enclosure 110 by maneuvering the external play item 106 through the exit openings 114. In contrast, the internal play items 104 cannot be removed from the hollow enclosure 110 by the animal.

The hollow enclosure 110 disclosed in the first embodiment of the animal entertainment device 100 has a dome-like shape as shown in FIGS. 1 and 2. The pet is able to crawl on top and around the animal entertainment device 100 in an attempt to get at the play items 104, 106 located in the hollow enclosure 110. The shape of the hollow enclosure 110 of the animal entertainment device 100 is not limited to the dome shape as disclosed in the first exemplary embodiment. A variety of enclosure 110 shapes can be used, for example but not limited to a polygon, sphere, pyramid, or similar shapes as described in later embodiments.

Access openings 112 are located on the surface of the enclosure 110. The access openings 112 are large enough to allow the pet to insert their paws to make contact with the play items 104, 106. The access openings 112 are also small enough to prevent both the internal play items 104 and external play items 106 from passing through the access openings 112. The access openings 112 and enclosure 110 also may serve to partially obstruct the sight of the pet of the play items 104, 106. Many pets, such as felines, are entertained by pawing or batting at a toy that is not within their vision. As the play item 104, 106 moves in and out of the sight of the feline, the feline is intrigued by the play item 104, 106 and further attempts to chase or bat at the play item 104, 106. The access openings 112 can be located on a variety of different locations on the surface of the enclosure 110. The access openings 112 can also have a variety of different shapes and sizes.

One or more exit openings 114 are also located on the surface of the hollow enclosure 110. The exit openings 114 allow the external play items 106 within the enclosure 110 to exit the enclosure 110. This allows the pet to play with the external play items 106 outside of the enclosure 110. The internal play items 104 cannot pass through the exit openings 114 because of their size/shape, requiring the pet to play with the internal play items 104 only through the access openings 112 of the enclosure 110. The combination of internal play items 104 and external play items 106 provides entertainment for the pet while preventing all of the play items 104, 106 from becoming lost.

The one or more exit openings 114 can be located in a variety of positions. The exit openings 114 can be located on the side of the enclosure 110 at the level of the floor of the base 108. Locating the exit openings 114 at this location would allow the external play items 106 to roll out of the enclosure 110. An alternative location of the exit openings 114 can require a greater degree of manipulation of the external play items 104 by the pet in order for the pet to remove the external play item 104 from the enclosure 110. For example, the exit openings 114 can be elevated above the floor of the base 108 on the side of the enclosure 110 or on the top of the enclosure 110. The external play item 106 then would not be able to roll out of the enclosure 110. To remove the external play items 106 the pet would have to lift and push the external play items 106 through the exit openings 114.

The base 108 of the housing 102 may have a surface that directs motion of the play items 104, 106. The floor provided by the base 108 can have a flat surface that allows the play items 104, 106 to roll freely around within the enclosure 110. The floor may also have a shape that facilitates motion of the play items 104, 106 in a specific direction. For example, concentric circles may be used to encourage the play items 104, 106 to roll in circles within the enclosure 110. In another example of the floor, a random undulating pattern can be used to direct the motion of the play items 104, 106 in random directions. The floor can also be designed to direct the play items 104, 106 away from the exit openings 114. This would require the pet to impart momentum on the external play items 106 in a specific direction to cause the external play items 106 to exit the enclosure 110 through the exit openings 114.

Figure 3:
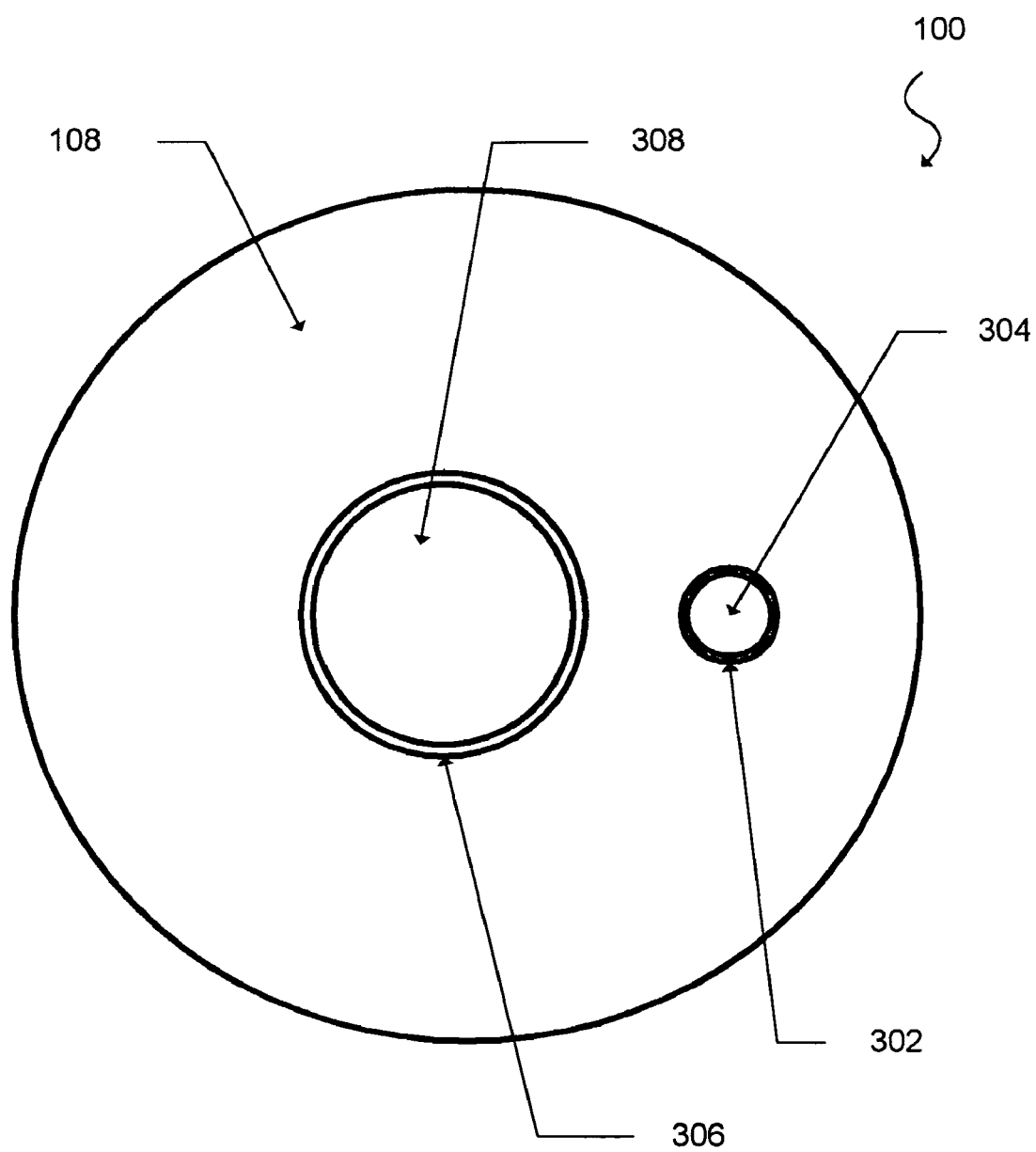
FIG. 3 is a bottom plan view of a base of the animal entertainment device, in accordance with the first exemplary embodiment of the invention.

FIG. 3 is a bottom plan view of the base 108 of the animal entertainment device 100, in accordance with the first exemplary embodiment of the invention. The base 108 of the housing 102 may be a weighted base 108 to prevent the housing 102 from moving when the pet is playing with the animal entertainment device 100. The weighted base can be accomplished in a variety of ways, for example but not limited to, constructing the base 108 with a heavier material, such as metal, or attaching weights to the bottom of the base 108.

The weighted base 108 can also be accomplished as disclosed in the first embodiment of the animal entertainment device 100. A filler opening 302 allows a filler compartment, internal to the base 108, to be filled with a filler material. A filler cap 304 provides access to the filler compartment. Prior to the pet playing with the animal entertainment device 100, a human flips the animal entertainment device 100 over and removes the filler cap 304. The filler compartment is filled with a filler material through the filler opening 302. The filler material can be a variety of materials, for example, sand, water, kitty litter, or other material. Once the base 108 has an adequate amount of filler material to prevent motion of the housing 102, the filler cap 304 is placed in the filler opening 302. The base 108 is placed on the ground and the device 100 is ready to entertain the pet.

The base 108 can also have a maintenance opening 306. The maintenance opening 306 provides a human access to the hollow enclosure 110 of the housing 102. Using the maintenance opening 306, a human can remove or insert all of the play items 104, 106. The maintenance opening 306 can also be used to clean the interior of the housing 102. A maintenance cap 308 is placed within the maintenance opening 306 to prevent access by the pet or removal of the play items 104, 106. In another example, the construction of the animal entertainment device 100 can provide access to the interior of the enclosure 110 by allowing the enclosure 110 of the housing 102 to detach from the base 108 of the housing 102. The human can remove the enclosure 110 to clean the enclosure 110 interior or add and remove play items 104, 106 from within the housing 102. Snaps, screws or other fasteners can be used to secure the enclosure 110 of the housing 102 to the base 108 of the housing 102.

The housing 102 can be made of a variety of materials, for example but not limited to, plastic, metal, wood, or cardboard. The housing 102 can be constructed by molding the material into the desired shape. The housing 102 can also be constructed by folding or pressing a sheet of material into a desired position. The housing 102 may be made of a variety of different colors and textured surfaces. For example, the enclosure 110 may be made of a translucent plastic to allow the pet to view the play items 104, 106 located within the enclosure 110. The enclosure 110 may also be made with a carpet-like surface, allowing the enclosure 110 to serve as an entertainment device and the exterior of the housing 102 to serve as a scratching surface for the pet.

Figure 4A:
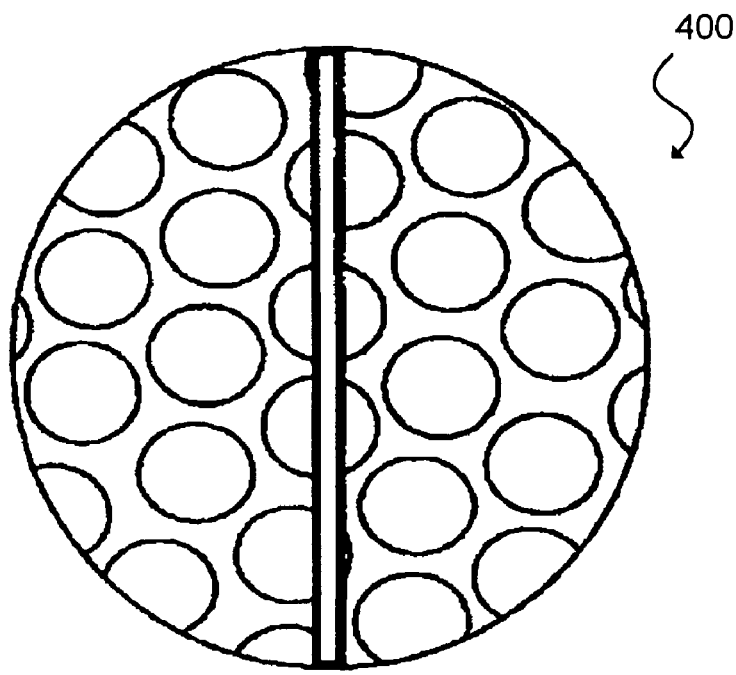
FIG. 4A is a front plan view of a play item of the animal entertainment device, in accordance with the first exemplary embodiment of the invention.

In accordance with the first embodiment, the animal entertainment device 100 can have two external play items 106 and two internal play items 104. FIG. 4A is a front plan view of an exemplary play item 400 that can be either an internal play item 104 or an external play item 106 of the animal entertainment device 100, in accordance with the first exemplary embodiment of the invention. In accordance with the first embodiment, both the external play items 106 and the internal play items 104 are round balls. The internal play items 104 of the first embodiment have larger diameters than the diameter of the exit openings 114, thus preventing the internal play items 104 from exiting the enclosure 110 through the exit openings 114. The two external play items 106 are balls that have diameters smaller than the exit openings 114, allowing the external play items 106 to pass through the exit openings 114. Neither internal play items 104 nor external play items 106 are small enough to pass through the smaller access openings 112.

The play items 104, 106 are not limited to the balls disclosed in the first exemplary embodiment. The play items 104, 106 can be a variety of shapes. For example, the play items 104, 106 can be oval or can be shaped to resemble a mouse or bird or other cartoonish or natural prey. The play items 104, 106 can be made of a variety of different materials, for example but not limited to, plastic, rubber, or fabric. The play items 104, 106 can also be a variety of colors or can be colored to resemble a cartoonish or natural prey.

The exit openings 114 are not limited to being selective based on the diameter of the play items 104, 106. Other factors can be used as the limiting factors to prevent exit of the internal play items 104. In another embodiment (not depicted in Figures), the internal play items 104 can be spherical balls while the external play items 106 are oval balls. The exit openings 114 can be oval shaped, thus preventing the spherical shaped internal play items 104 from passing through the exit while allowing the oval shaped external play items 106 to pass through the exit openings 114.

The play items 104, 106 are also not limited to passive play toys that require momentum from the pet for motion. The play items 104, 106 can incorporate a vibrating or wobbly motor with a power source within the play item 104, 106 to cause the play item 104, 106 to move under its own power, thus sparking the interest of the pet in chasing the play item 104, 106. The play item 104, 106 may also incorporate magnets that use the motion of external magnets to cause the play item 104, 106 to move and spark the interest of the pet.

Figure 4B:
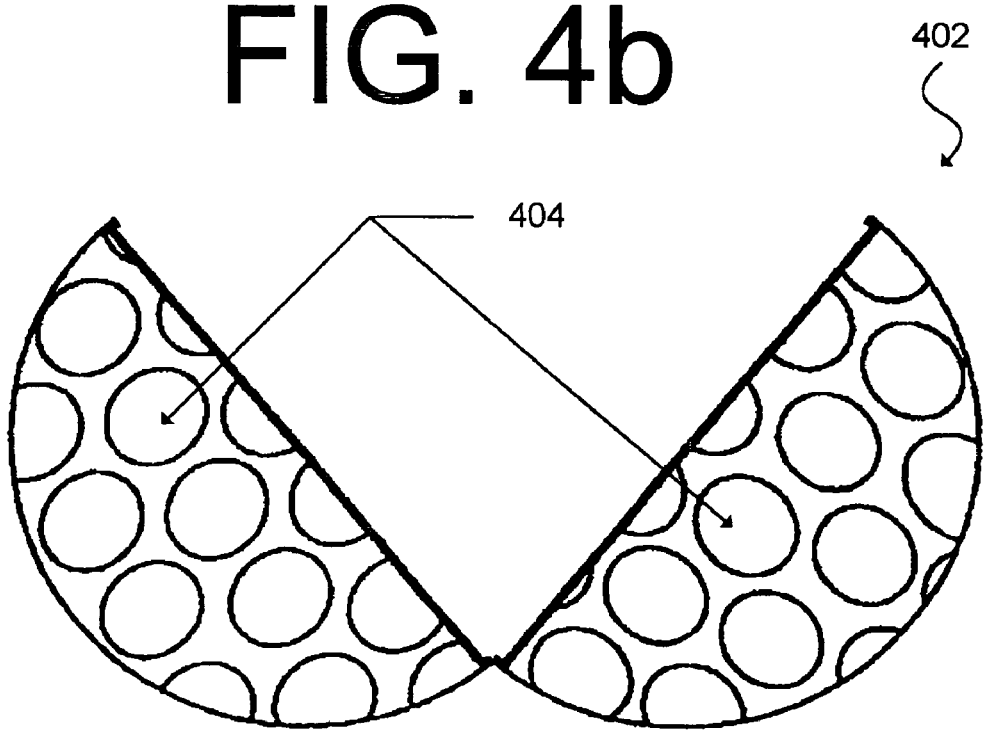
FIG. 4B is a front plan view of an opened play item of the animal entertainment device, in accordance with the first exemplary embodiment of the invention.

Animal attractants may also be incorporated into the play items 104, 106. For example, catnip, food or other animal attractants can be housed within the play item 104, 106 to gain the attention of the pet. FIG. 4B is a front plan view of an opened exemplary play item 402 of the animal entertainment device 100, in accordance with the first embodiment. The play items 104, 106, in accordance with the first embodiment, are made of two hemispheres 404 that snap together using a compression fitting to make a sphere. Prior to snapping the two hemispheres 404 together, an animal attractant can be inserted within the hemispheres 404. Pores in the surface of the play item 104, 106 allow the aroma of the attractant to enter the air space surrounding the play item 104, 106. When the pet plays with the play item 104, 106 causing the play item 104, 106 to roll, the animal attractant is agitated causing a greater concentration of airborne attractant surrounding the play item 104, 106. As the animal attractant becomes dried out and used, the play item 104, 106 can be unsnapped, as shown in FIG. 4B. The animal attractant can be replaced with fresh animal attractant and the two hemispheres 404 can be snapped back together.

Figure 5:
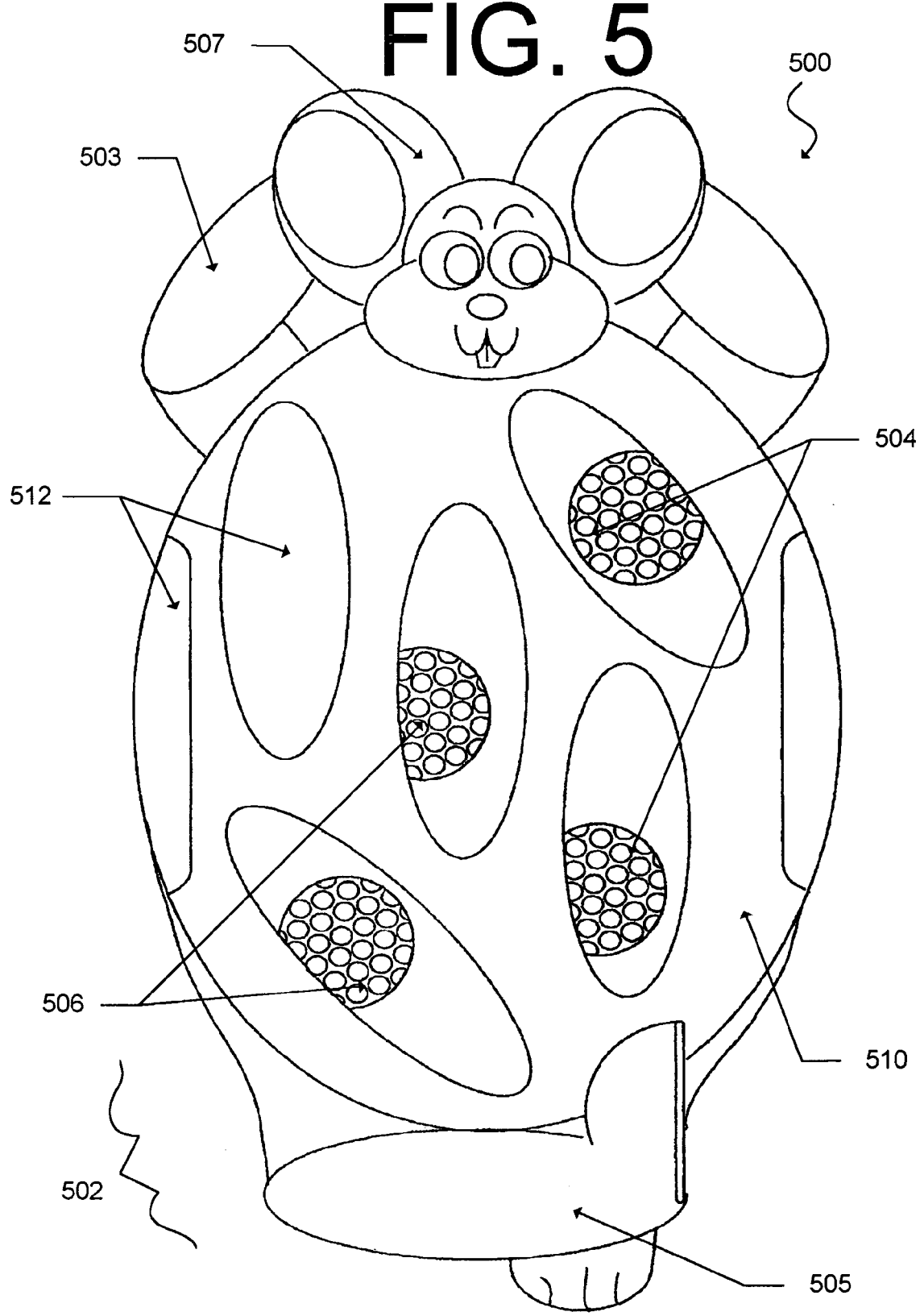
FIG. 5 is a top plan view of the animal entertainment device, in accordance with a second exemplary embodiment of the invention.
Figure 6:
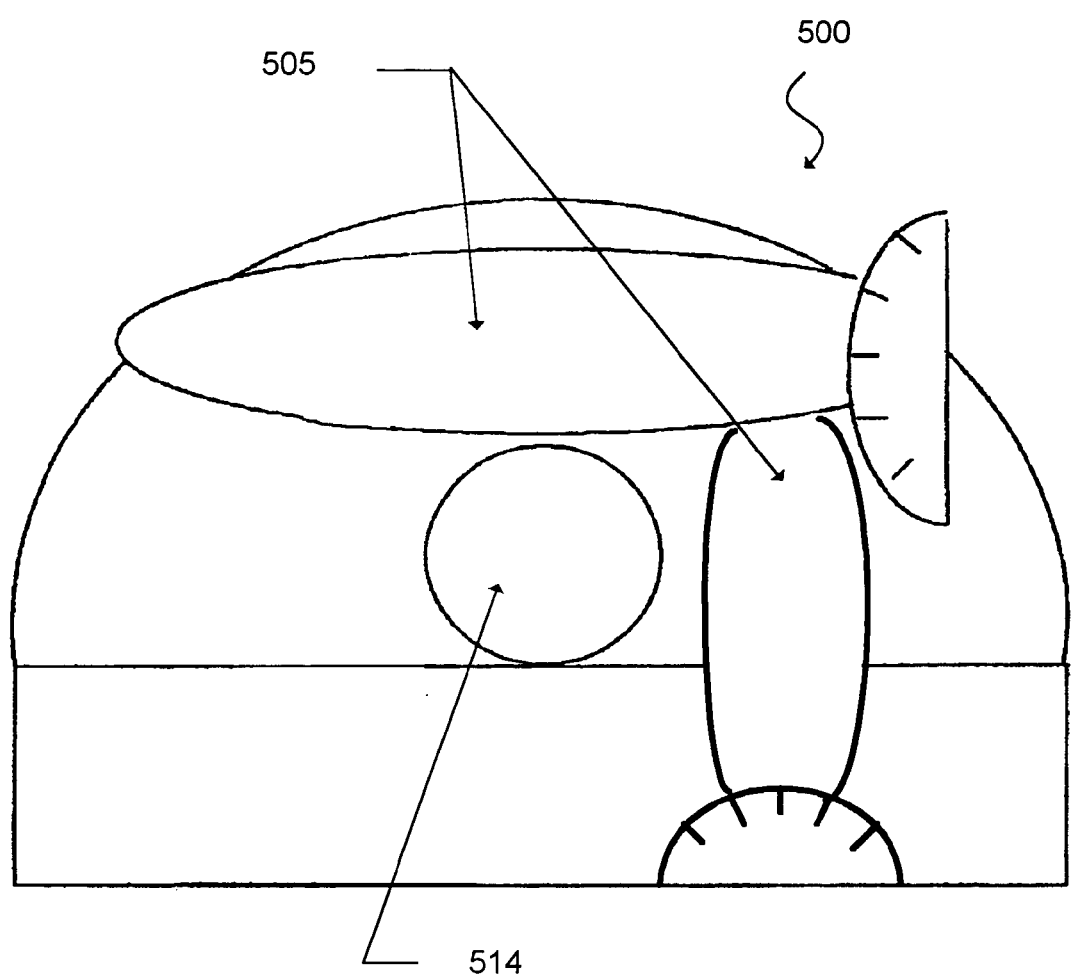
FIG. 6 is a front plan view of the animal entertainment device, in accordance with the second exemplary embodiment of the invention.

FIG. 5 is a top plan view and FIG. 6 is a front plan view of the animal entertainment device 500, in accordance with the second exemplary embodiment of the invention. In the second exemplary embodiment, the animal entertainment device 500 is designed to resemble a cartoon mouse character. The housing 502 is designed to resemble the midsection of the mouse. Peripheral members extend from the sides of the housing 502 to resemble extremities, for example but not limited to, the arms 503, legs 505, and head 507 of the mouse. The peripheral members can be molded together with the housing 502 or can be manufactured separately and fastened to the housing 502. The access openings 512 are located on the surface of the enclosure 510 across the midsection of the mouse. The internal play items 504 and external play items 506 are located in the interior of the enclosure 510 and roll freely within the midsection of the mouse.

The exit opening 514 is on the front side of the enclosure 510 as shown in FIG. 6. The legs 505 of the cartoon mouse hide the exit opening 514. The enclosure 510 of the second embodiment requires the pet to manipulate the play items 504, 506 through access openings 512 on the midsection of the mouse and push the external play items 504 out of the exit opening 514 on the front side. The features disclosed in the first embodiment of the animal entertainment device 100 can be incorporated in the animal entertainment device 500 of the second embodiment as well as other examples or embodiments.

Figure 7:
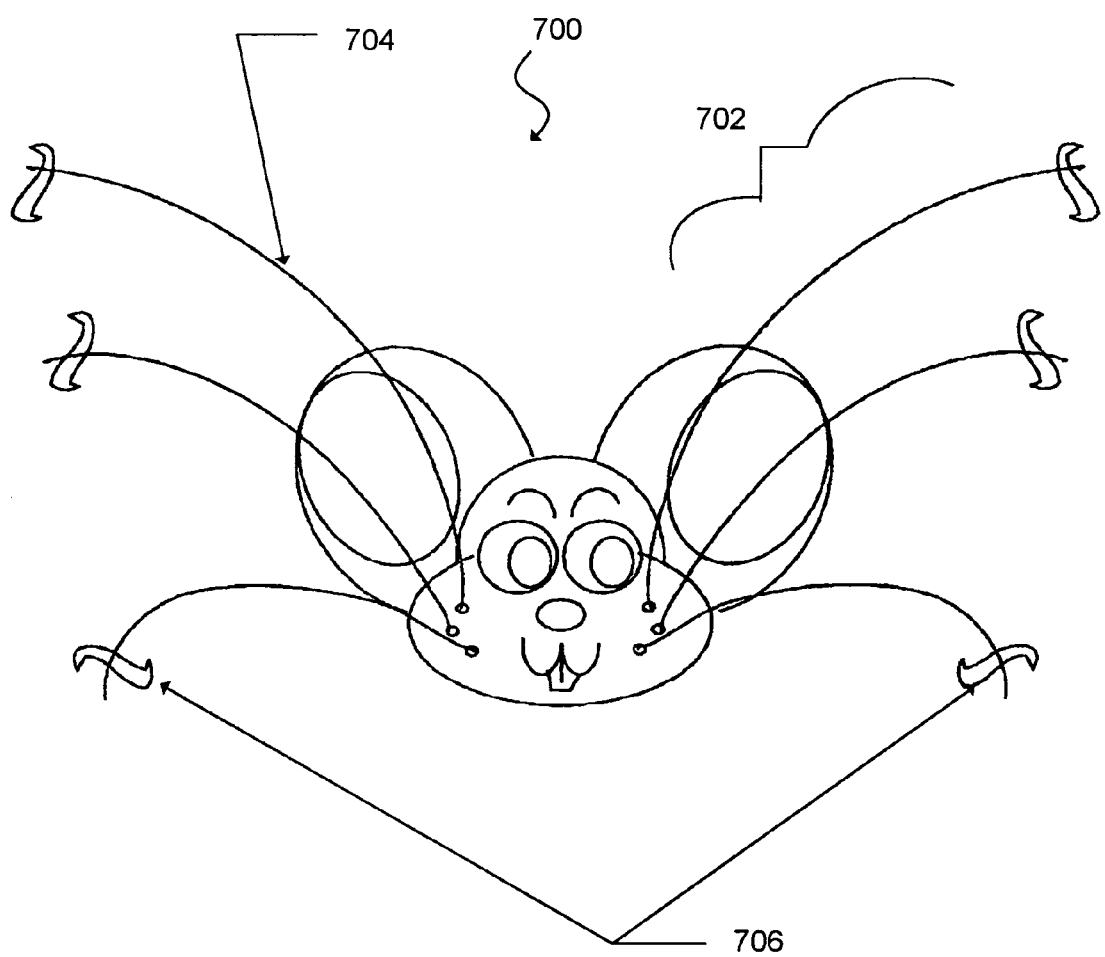
FIG. 7 is a front plan view of a mouse head coupled to the animal entertainment device of the second embodiment, in accordance with a third exemplary embodiment of the invention.

FIG. 7 is a front plan view of a mouse head 700 coupled to the animal entertainment device 500 of the second embodiment, in accordance with a third exemplary embodiment of the invention. The third exemplary embodiment incorporates whiskers 702 on the cheek of the cartoon mouse of the second exemplary embodiment. The whiskers 702 are made of wires 704 extending from the cheek of the mouse. As the pet plays with the housing 502, the movement and vibration transferred from the pet to the housing 502 causes the whiskers 702 to jiggle. The jiggling may serve to further attract the attention of the pet. The pet may bat or paw at the whiskers 702 and be entertained by the motion of the whiskers 702. The whisker can be made of plastic or metal wires 704. The wires 704 may be coated with a plastic or rubber. In addition, the whiskers 704 may have fabric pieces 706 fastened to the distal end of the whiskers 702. The fabric pieces 706 may further serve to aid in the motion of the whiskers 702 and entertaining the pet.

Figure 8:
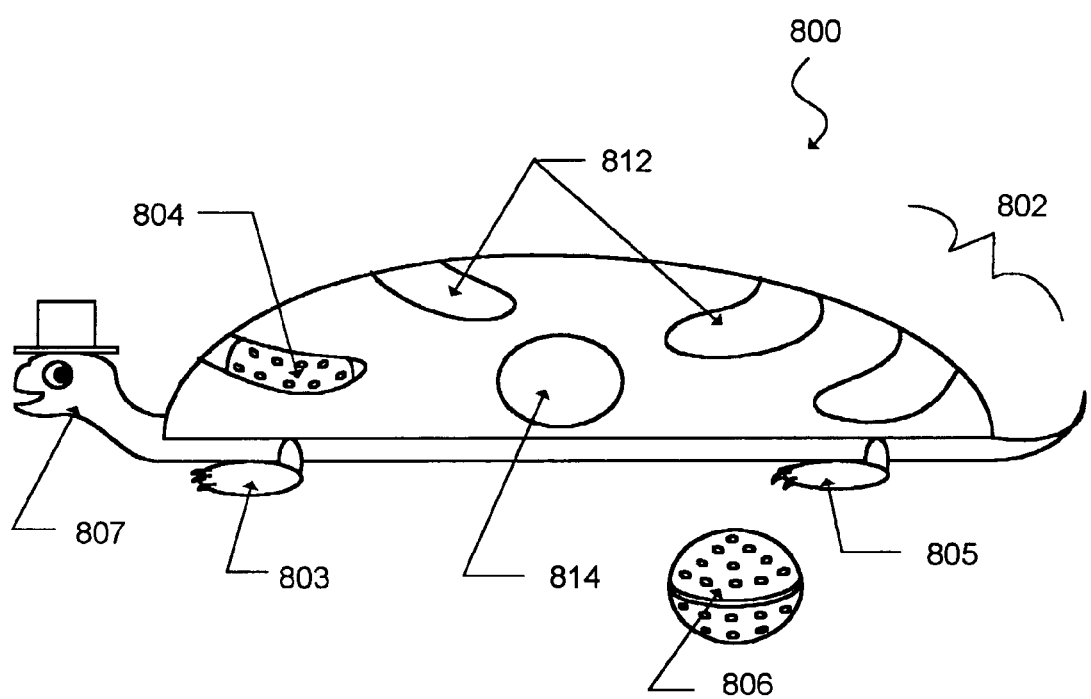
FIG. 8 is a front plan view of the animal entertainment device, in accordance with a fourth exemplary embodiment of the invention.

FIG. 8 is a front plan view of the animal entertainment device 800, in accordance with the fourth exemplary embodiment. The housing 802 of the fourth exemplary embodiment is designed to resemble a turtle. Similar to the second exemplary embodiment, peripheral members extend from the sides of the enclosure to resemble the arms 803, legs 805, and head 807 of the turtle. The housing 802 of the fourth exemplary embodiment also has an internal play item 804 and an external play item 806. The housing 802 of the fourth embodiment is designed to resemble the shell of the turtle. The access openings 812 and exit openings 814 are located on the surface of the shell and are designed to resemble patterns of a turtle shell. The housing enclosure is not limited to the shapes disclosed in the above embodiments. A variety of shapes or colors can be used to produce animal entertainment devices 100 that resemble a variety of cartoonish or natural characters.

It should be emphasized that the above-described embodiments of the present invention, particularly, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. An entertainment device for use by animals, comprising:
    a hollow enclosure with one or more access openings and one or more exit openings and containing one or more play items with diameters larger than the access openings and the exit openings and one or more smaller play items with diameters larger than the access openings and smaller than the exit openings wherein the enclosure has a weighted base and the weighted base is a compartment filled with filler material.

2. The device of claim 1, wherein the hollow enclosure also comprises a maintenance opening with a diameter larger than the play items.

3. The device of claim 1, wherein the one or more exit openings are located on an elevated surface of the hollow enclosure that requires manipulation of the smaller play items by the animal to lift and remove the smaller play item through the one or more exit openings.

4. The device of claim 1, wherein an exterior surface of the enclosure resembles a mouse.

5. The device of claim 1, wherein at least one play item has an animal attractant housed within the play item.

6. The device of claim 5, wherein the one or more play items are spheres that each comprise two hemispheres that couple together.

7. The device of claim 6, wherein an animal attractant can be placed within the two hemispheres prior to coupling the hemispheres together to form the sphere.

8. The device of claim 1, wherein the one or more wires extend from the exterior surface of the enclosure to resemble whiskers of a mouse.

9. The device of claim 8, wherein each of the one or more wires has a fabric strip extending from a distal end of the one or more wires.

10. The device of claim 8, wherein the one or more wires extend from the exterior surface of the enclosure to resemble whiskers of a mouse.

11. The device of claim 10, wherein each of the one or more wires has a fabric strip extending from a distal end of the one or more wires.

12. The device of claim 1, wherein the access openings are large enough for the animal to insert a paw.

13. An exercise device for use by pets, comprising:
    a housing with a base and a curved top portion with one or more access openings and one or more exit openings wherein the housing forms an interior compartment containing one or more balls with diameters larger than the access openings and the exit openings and one or more smaller balls with diameters larger than the access openings and smaller than the exit openings wherein one or more wires extend from an exterior surface of the hollow enclosure and wherein the wires jiggle when contact with the housing vibrates the wires.

14. The device of claim 13, wherein the one or more exit openings are located on an elevated surface of the hollow enclosure that requires manipulation of the smaller play item by the animal to lift and remove the smaller play item through the one or more exit openings.

15. The device of claim 13, wherein an exterior surface of the enclosure resembles a cartoon resembling character.

16. The device of claim 13, wherein at least one play item has an animal attractant housed within the play item.

17. The device of claim 13, wherein each of the one or more wires has a fabric strip extending from a distal end of the one or more wires.

18. An entertainment device for use by pets with a housing, comprising:
    a weighted base;
    a curved top portion on top of the base resembling the mid-section of a character;
    one or more peripheral members extending from the housing resembling extremities of the character;
    one or more wires extending from the peripheral members resembling whiskers of the character;
    one or more access openings large enough for the pet to insert a paw; one or more exit openings; and
    an interior section holding one or more balls with diameters larger than the access openings and the exit openings and one or more smaller balls with diameters larger than the access openings and smaller than the exit openings wherein the one or more play items have an animal attractant housed within at least one ball and the one or more exit openings are located on an elevated surface of the housing that requires manipulation of the smaller ball by the pet to lift and remove the smaller ball through the one or more exit openings.

19. An entertainment device for use by animals, comprising:
    a hollow enclosure with one or more access openings and one or more exit openings and containing one or more play items with diameters larger than the access openings and the exit openings and one or more smaller play items with diameters larger than the access openings and smaller than the exit openings; and
    one or more wires extend from an exterior surface of the hollow enclosure and the one or more wires wiggle when contact of the hollow enclosure vibrates the wires.

* * * * *